Oct. 24, 1933. R. E. BEEGLE 1,932,011
TOOL HANDLE
Filed Sept. 1, 1932 2 Sheets-Sheet 2
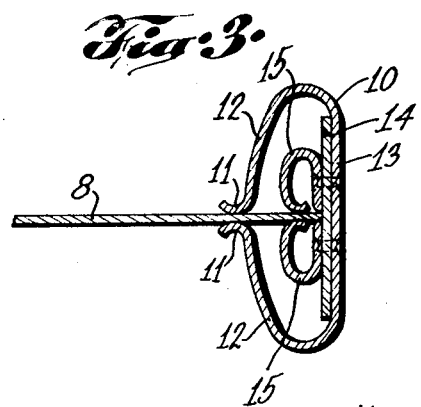
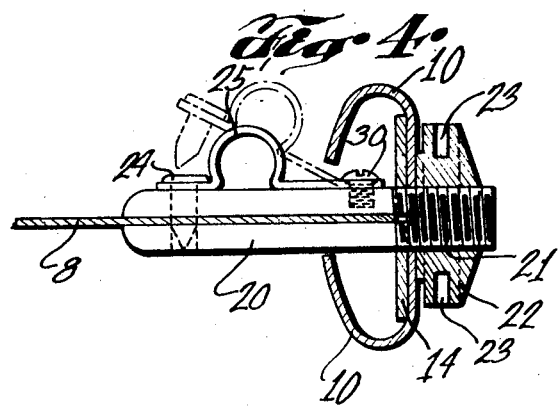
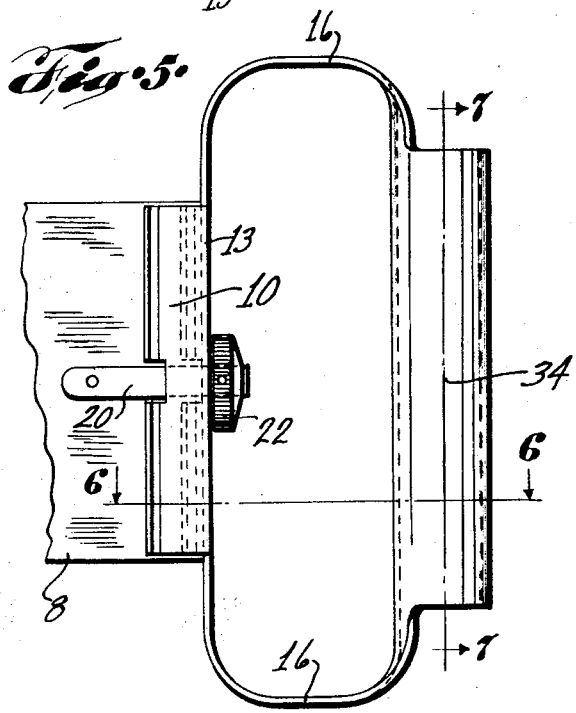
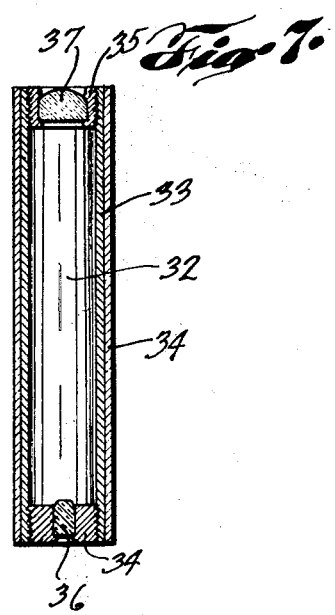
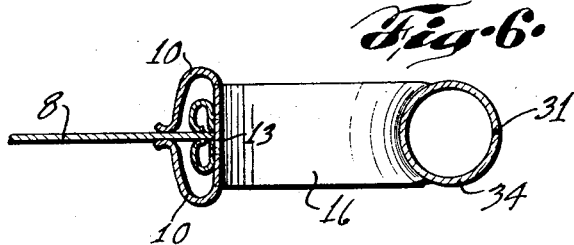
INVENTOR.
Raymond E. Beegle.

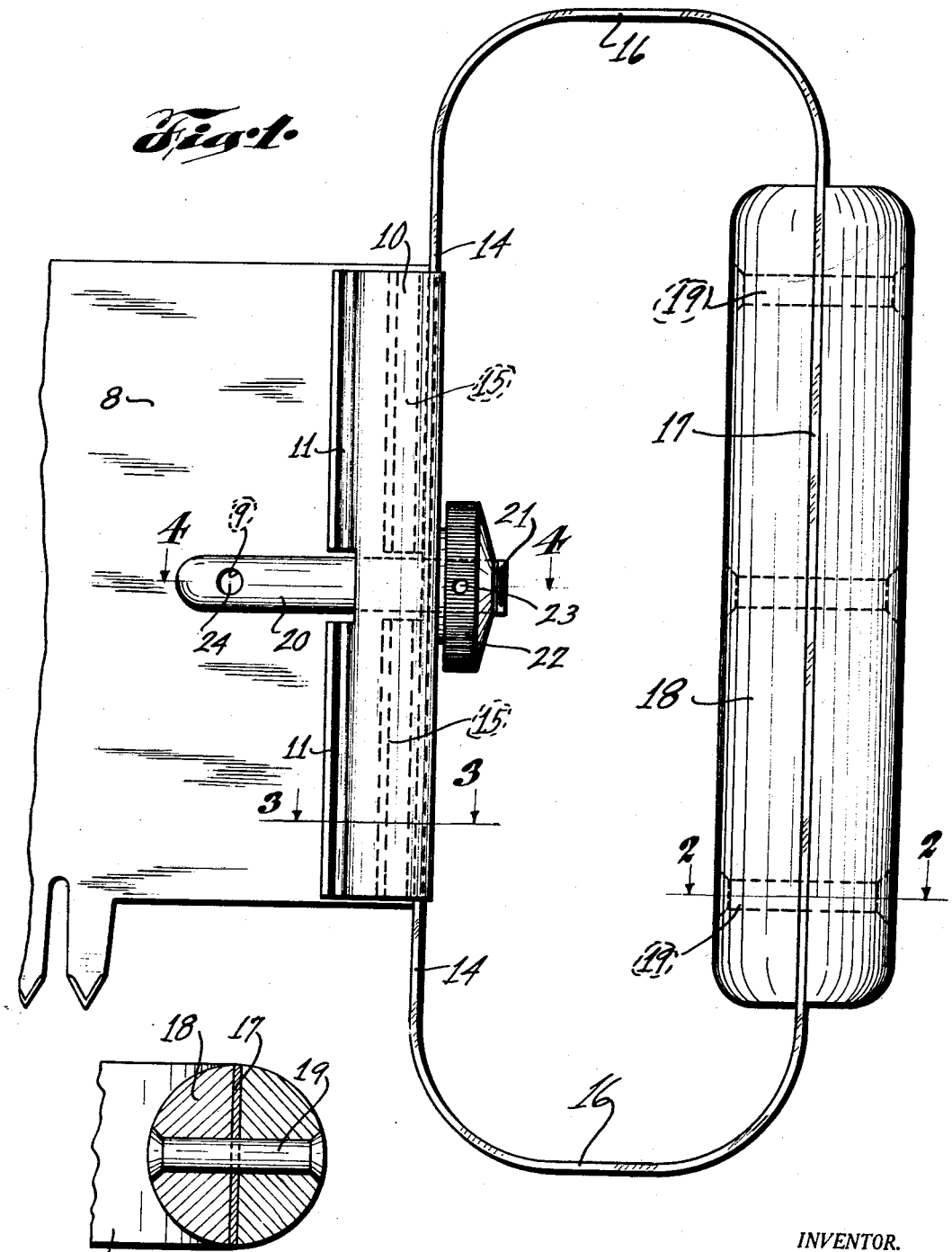

Patented Oct. 24, 1933

1,932,011

UNITED STATES PATENT OFFICE 1,932,011

TOOL HANDLE

Raymond E. Beegle, East St. Louis, Ill.

Application September 1, 1932. Serial No. 631,326

9 Claims. (Cl. 145—109)

This invention relates to improvements in tool handles, and more particularly to an improved construction and arrangement of handle elements for use with tools which tend, incident to their use, to subject the hand and arm of the operator to jolts and impacts.

An object of the present invention is attained in a tool handle formed of a resilient material, and particularly in a novel and advantageous resilient connection between the handle proper, and the tool to which it is connected.

A further object of the invention consists in an elimination in tools of certain types, such as saws for felling and cross-cutting timber, of all projections incident to the handle or its fastening means which might in any manner abrade or harm the hand of the operator.

An additional object of the invention is attained in an improved handle of a type particularly adapted to saws and the like, in which an entirely free, clear and unobstructed space is provided between the handle proper and the blade or body of the saw or other tool to which it is attached.

A still further object of the invention is attained in a resilient handle structure for tools, and particularly adapted for use with a saw, in which the handle portion is relatively rigidly maintained in the plane of the saw, but is yieldably or resiliently spaced, distantly, from the body of the tool, such as the blade of the saw.

A still further object of the invention is attained in an improved quick-detachable connection between a tool and tool handle, such that, as is of advantage in felling timber, the handle may be removed from the saw or other tool upon a moment's notice.

A still further object is attained in the structural combination with a handle for saws and the like, of a telescope or similar optical device of aid to a timberman in sighting trees for felling purposes.

The foregoing and further objects will more fully and at large appear from the following detailed description of a preferred embodiment of the invention and modifications thereof, and from the drawings accompanying the specification, and in which:

Fig. 1 is a side elevation of a preferred form of tool handle, showing the manner of its application to one end of a saw blade; Fig. 2 is a section as viewed along line 2—2 of Fig. 1; Fig. 3 is a fragmentary section as viewed along line 3—3 of Fig. 1; Fig. 4 is a fragmentary section along line 4—4 of Fig. 1 and illustrating a quick-detachable handle connection; Fig. 5 is a side elevation, corresponding to that of Fig. 1, and illustrating a modified form of saw handle; Fig. 6 is a section along line 6—6 of Fig. 5, and Fig. 7 is a longitudinal elevation along line 7—7 of Fig. 5, illustrating a suggested arrangement and mounting of a telescope or similar optical instrument as utilized for sighting purposes.

Referring now by characters of reference to the drawings, there is shown at 8, one end of a saw blade which may be of any suitable or conventional construction, for example, a two-man cross cut saw, such as used for timber felling purposes. The blade end is provided, a small distance inwardly of its end margin, with an opening 9, according to prevailing construction.

Figure 3 illustrates, sectionally, a member 10, being in the example a tubular member formed of a resilient material such as spring steel of a suitable gauge. In forming the member 10, however, the ends of the sheet material are not joined, but the longitudinal margins 11 of the adjacent ends are curved outwardly and away from the body of the member 10, as shown. The adjacent jaw portions 12 result from the initial shape given the member 10 and tend to bear snugly against each other along the curved lines of the portions 11, so that, in effect, the portions 12 serve as clamping jaws for grippingly engaging opposite sides of the blade 8. A plane portion 13 of the tubular member 10 characterizes its rear side, and forms a smooth face portion presented toward the handle proper as will later appear. Inwardly of the portion 13, and longitudinally of the member 10, is a strap member 14, secured as by riveting, to the inner surface of the portion 13. For further gripping engagement of the saw blade, there are provided, one on each side of the inner edge of the blade, additional tubular members 15 which are conveniently formed of the same material as constitutes the tube 10. The members 15 are so formed initially that, due to their anchorage and shape, they serve in a manner similar to the portions 11, as jaw members, grippingly to engage the blade at a point spaced from the engagement thereby of the parts 11.

My preference is to construct the tubular member 10 of a length corresponding substantially to the width of the blade 8, at its handled end. The member 13, or optionally the portion 14, is, however, brought to project endwise of the tubular member, first extended into plane portions substantially aligned with each other, the plane portions then being bent rearwardly and arcuately to form curved spring elements 16 at the top and bottom of the handle. From these outer ends of the handle, the curved portions are brought toward each other into alignment to constitute a longitudinal portion 17 parallel to the rear edge of the saw and to the portion 13 of the tube 10. According to the structure of Fig. 1, there is provided for gripping purposes, a handle 18 composed of complementary wood or fibrous semi-cylindrical handle portions, riveted by members 19 or otherwise secured into assembly with each other and to the portion 17 of the handle.

As a means for attachment of the handle assembly thus far described, to the end of the saw blade, my preference is to employ a split bolt 20, one of the furcations of which extends lengthwise and centrally of the saw blade end, this relation best appearing in Fig. 4. The two furcations merge into a threaded shank portion 21, the bolt being split, by preference, only up to the threaded shank. The members 14 and 10 are centrally apertured to pass the threaded end of the bolt, to which, following attachment of the handle assembly say to a saw, is secured a nut 22 provided with a milled-periphery and by preference with radial recesses 23, to receive a spanner wrench or other tightening tool.

Projecting through registering apertures in the opposite furcations of the bolt 20, is a lock stud 24, carried by a spring arm 25, the stud projecting through a suitable end opening therefor, and being by preference spot welded to the spring arm so as to remain therewith at all times. The opposite end of the spring arm is apertured to receive a screw 30, for the reception of which one of the arms of the split bolt is provided with a tapped recess, (Fig. 4). It will appear that the loop portion formed centrally of the spring arm 25 enables the ready insertion thereunder of a finger of the operator, so that the spring arm may be instantly pried to open position, as shown in dotted lines, thus instantly releasing the handle assembly, as a unit, from the saw. This is of advantage in felling timber, since in case a saw is working at a substantial depth within the tree, once the tree starts to fall, the quick detachable feature above described, enables the removal of one handle and permits the saw to be drawn quickly through the saw-cut. The timberman is thus enabled quickly to remove the tool from a location of possible injury by the falling tree.

In Figs. 5 and 6 is shown a modification of the structure described, which is essentially the same as that of Figs. 1, 2 and 3, except that the use of the strap 14, as a separate element, is obviated, and the structure accordingly simplified. According to the modification, the plane portion of the tubular element such as 10 is, itself, produced endwise to form the curved or arcuate end portions of the handle connection, and also to form the handle proper. According to this arrangement the stock or piece of material is of such initial width that wing portions remain, which are bent into semi-circular shape to result in a handle of circular section, best shown in Fig. 6. The mating ends of the wing portions may be welded as at 31, to seal the joint formed therebetween. The resulting hollow tubular handle structure of Figs. 5 and 6 may be utilized as a holder or carrier for a sighting device, illustrated as consisting of a telescope shown generally at 32, (Fig. 7) and shown diagrammatically as including a fiber tube 33 which fits snugly into the hollow handle structure 34. There are threaded into the ends of the tube 33 lens holders 34 and 35, containing respectively the eye piece and objective lenses 36 and 37. Any suitable type of telescope or kindred optical instrument may, of course, be employed, the specific structure of such instrument constituting no part of the present invention.

The manner of application of the described handle assembly is thought to be apparent from the foregoing description of the detachable connection illustrated in Fig. 4. It may, however, be noted that it is usual to apply first, the bifurcate bolt 20 to the saw end, with the stud or pin 24 extending through the opening 9 and with the nut 22 removed from the shank 21. The handle assembly of selected type is then inserted over the threaded end of the bolt, the nut being applied and threaded up as tightly as possible. Due to the fact that the straight end margin of the saw snugly abuts the strap 14 or, according to the modification, the inner surface of portion 13 of the tube 10, it will appear that as the nut 22 is tightly taken up, there is no appreciable tendency for the handle assembly to oscillate about the stud 24 as a pivot. Likewise, the width of the spring stock constituting the members 13, 14, 16, 17, etc., is such that the handle portion 18 or 34 will, in a handle of the type illustrated, always be kept in parallelism with the body of the saw.

It will appear in attainment of an important object of the invention that the curved ends such as 16, constitute a spring connection between the handle proper and the saw, so that, at each stroke of the saw or other tool, the operator's hand and arm are cushioned from the impact or like effect resulting from striking an obstruction with the tool, and normally resulting at the beginning of the stroke, due for example, to the effect of friction at rest, between the saw and the timber in which it is operating.

In the prevailing construction of saws utilized for felling and kindred purposes in the western timber regions, a bolt projects from the blade of the saw end, and transversely through the handle, a nut being provided intermediately of the handle and on such a portion thereof as to form a distinct obstruction and wearing obstacle to the hand. The handle such as either 18 or 34 of the present device being characterized by a somewhat smooth cylindrical periphery, clearly avoids any sharp projection or obstacle, such as heretofore encountered. Also, importantly, the space between the handle and saw end is positively free of any obstruction whatever to the back of the hand and fingers of the operator. It also results as a distinct advantage that the arcuate end portions of the handle assembly project above and below the body of the saw blade to a substantial extent thereby serving as a guard to prevent accidental contact of the hand or other parts of the body, either with the teeth of the saw or with the wood or other abrading objects.

It is of course within the present invention that the stock constituting the portions 16, etc., of the handle-carrying spring loop heretofore described, be, at least in part, of slightly curved section, thus adding materially to the transverse rigidity of the structure without harmfully impairing its resilience as considered distantly with respect to the saw blade.

I have also contemplated that, instead of locking the gripping portion, such as 18 or 34, at a right angle to the longitudinal axis of the saw or other tool, the arcuate metal portions such as 16, may be of differential length at the top and bottom of the handle, the lower thereof for example being longer so that the handle forms an acute angle to the axis of the saw. When the saw is used for a vertical cut, such an angular disposition of the handle is still in keeping with the natural position of the hand. I have also contemplated that by suitably extending one or both of the bent, resilient loop portions 16, the handle may be disposed at a substantial angle to the plane of the saw blade, either intersecting or being disposed entirely above such plane.

It will also appear that, by varying the radius of curvature of the ends of the spring loop, and also by varying the gauge and/or temper of the stock from which the loop is formed, the resilience and cushioning effect realized, both on the inward and outward strokes of the tool, may be controlled to suit exactly the particular operator and conditions to be encountered.

It will appear also that numerous other modifications may be made from the examples shown and described, the general principles being applicable to tools and instruments other than saws, and further that the several parts and their combinations may be modified substantially, without departing from the spirit and full intended scope of the invention, as defined by the claims hereunto appended.

I claim as my invention:

1. A quick-detachable connection for securing a saw handle to a saw, including in combination with the handle and saw, a split bolt adapted to receive the saw between its furcations and having a threaded end extended beyond the saw, a member adapted to abut transversely the end of the saw blade and being apertured to receive the split bolt, the saw blade having an aperture adjacent the split bolt, and both furcations of the bolt being provided, opposite the threaded bolt end, with openings in register with the saw aperture, a pin adapted to extend through the openings and apertures of the saw blade and bolt, a spring arm secured at one end to said pin, a finger engaging ring on the pin-engaging end of said arm, means securing the opposite end of said spring arm to an intermediate portion of said bolt, and a nut engaging the threaded part of the bolt.

2. In combination with a saw, a handle including a loop portion formed of a strip of spring metal, the outer face of one side of the loop forming a seat for the end of the saw, a pair of resilient clamping jaws projecting laterally of said seat, and adapted to engage opposite sides of the saw, threaded clamping means engaging the saw and extending between the clamping jaws and through the said seat portion, and a handle carried by the opposite side of said loop portion, the ends of the loop forming cushioning elements between the handle and saw, one thereof being bowed outwardly of the loop and below the saw teeth to serve as a hand guard.

3. A tool handle assembly adapted for saws and the like, including a resilient metal loop portion, adapted to be disposed at one end of a saw, paired wing portions extended laterally of one side of the loop portion and bent toward themselves to form gripping jaws for the tool, and a second pair of tool gripping jaws, carried within said first named jaws and secured to the loop portion, and a handle carried by the opposite side of the loop.

4. A saw handle of oblong shape formed of a strip of resilient metal, resilient saw embracing jaws projecting laterally from one side of the oblong portion, and a grip carried at the opposite side of said oblong portion, the ends of such portion constituting resilient shock-absorbing connections between the grip and the saw connected thereto.

5. A handle assembly for a saw or like tool, formed of a strip of resilient metal looped upon itself, projections carried by one side of the looped portion and bent toward each other beyond the loop portion for yieldably gripping the handled element therebetween, the opposite side of the loop portion being provided with projections, curved rearwardly of the saw and loop, and toward each other to form a gripping portion.

6. In combination with a saw, a handle including a substantially cylindrical grip portion, spring arms extended from each end of the grip portion, and means for detachably connecting said arms to the handled tool or element, one of said spring arms projecting endwise of the handle, to a point beyond the teeth of the saw, said arm being bowed to override obstructions in either direction of saw movement.

7. In a handle for a saw or like tool, a tubular element formed of resilient material and having a longitudinal opening or slot along one side adapted to receive the handled element such as a saw blade, a plate element within the tubular structure adapted abuttingly to engage an end face of the handled element, a threaded clamping member detachably carried by the handled element and projecting through said plate and the side of said tubular structure, means exterior of the tubular element engaging said clamping member, and a grip portion carried by, and spaced from the tubular element.

8. A saw handle assembly including, in combination with a saw, a loop portion formed of a continuous strip of metal, a saw-blade-securing seat carried by one side of said loop, and abutting the end of the saw blade, a grip portion carried by the opposite side of said loop, and disposed substantially parallel to the saw blade seat, resilient portions formed by the ends of the loop, and bridging the ends of the grip and seat, one of said resilient portions projecting below the grip and providing a combined shock absorbing element and hand guard.

9. In a handle assembly for a saw, a spring metal loop adapted to be disposed transversely of the handled end of the saw, laterally extended spring clamping wings or jaws projecting laterally of that portion of the loop lying adjacent to the saw, the wings being of a length to extend substantially over the width of the saw, the saw having a central aperture inwardly of its handled end and near said wing portions, a split bolt embracing opposite sides of the saw and having openings through its legs adapted to register with the aperture in the saw blade, the bolt extending through said wings and through the loop portion nearest the saw, the threaded shank of the bolt extended inwardly of the loop, a clamping nut carried by the bolt, a spring arm carried at one end by one leg of said bolt, and provided with a finger-receiving loop intermediate its ends, a stud carried by the opposite end of said spring arm and adapted to extend through the openings in the saw and split bolt, a pair of auxiliary spring arms disposed between and inwardly of those first mentioned, and adapted grippingly to engage the opposite sides of the saw blade nearest its handled margin, the extremities of said loop portion being carried above and below the saw and constituting spring arms, shaped and positioned to guard against casual contact with the teeth of the saw, the side of said loop most remote from the saw being characterized by laterally projecting wing portions bent toward each other, and joined to constitute a cylindrical gripping portion spaced substantially from said bolt and clamping nut, so as to leave a free open space within the loop portion for the operator's hand.

RAYMOND E. BEEGLE.